US010557322B2

(12) United States Patent
Perez et al.

(10) Patent No.: US 10,557,322 B2
(45) Date of Patent: Feb. 11, 2020

(54) SEPARATION SYSTEM FOR USE WITH WEIGHTING MATERIALS IN DRILLING FLUIDS

(71) Applicant: FSI HOLDINGS, LLC, Houston, TX (US)

(72) Inventors: Octavio Perez, Houston, TX (US); Ben Hiltl, Houston, TX (US)

(73) Assignee: FSI HOLDINGS, LLC, Houston, TX (US)

( * ) Notice: Subject to any disclaimer, the term of this patent is extended or adjusted under 35 U.S.C. 154(b) by 329 days.

(21) Appl. No.: 15/630,350

(22) Filed: Jun. 22, 2017

(65) Prior Publication Data
US 2018/0371854 A1 Dec. 27, 2018

(51) Int. Cl.
*E21B 21/06* (2006.01)
*B01D 21/26* (2006.01)
*B01D 21/02* (2006.01)
*B07B 1/46* (2006.01)

(52) U.S. Cl.
CPC ............ *E21B 21/065* (2013.01); *B01D 21/02* (2013.01); *B01D 21/262* (2013.01); *B07B 1/46* (2013.01)

(58) Field of Classification Search
CPC .... B01D 19/00; B01D 19/0057; B01D 45/12; B04C 5/08; B04C 5/04; E21B 21/065; E21B 21/066; E21B 21/063
USPC ............ 95/261, 253; 96/208, 209, 212, 216; 166/267; 175/206; 210/263, 189, 265, 210/268, 273
See application file for complete search history.

(56) References Cited

U.S. PATENT DOCUMENTS

| | | | |
|---|---|---|---|
| 2,671,560 A | 3/1954 | Fontein et al. | |
| 2,982,401 A | 5/1961 | Talbot | |
| 3,737,037 A | 6/1973 | Bone | |
| 3,766,997 A * | 10/1973 | Heilhecker | E21B 21/065 175/66 |
| 4,208,270 A | 6/1980 | Grieve et al. | |
| 4,482,459 A | 11/1984 | Shriver | |
| 4,804,461 A | 2/1989 | Heinrich | |
| 4,836,302 A | 6/1989 | Heilhecker et al. | |
| 6,036,870 A | 3/2000 | Briant et al. | |
| 7,867,399 B2 | 1/2011 | Jones et al. | |
| 2002/0074269 A1 | 6/2002 | Hensley et al. | |
| 2011/0017600 A1 * | 1/2011 | Larson | E21B 21/065 204/557 |

* cited by examiner

*Primary Examiner* — Thuan D Dang
(74) *Attorney, Agent, or Firm* — Egbert Law Offices, PLLC

(57) ABSTRACT

A separation system for use with weighting materials in drilling fluids, the separation system has a body with an interior, a distribution chamber positioned in the interior of the body, a drilling fluid inlet pipe extending into the body in communicating with the distribution chamber, an overflow chamber positioned in the body, and at least one separation chamber positioned in the body and extending below the distribution chamber. The distribution chamber is configured to allow the drilling fluid to pass to the separation chamber. The separation chamber has a high-gravity solids outlet adjacent a lower end thereof and a fluid outlet adjacent an upper end thereof. The fluid outlet communicates with the overflow chamber. The separation channel has an inner diameter that tapers so as to narrow from the upper end thereof to the lower end thereof.

16 Claims, 7 Drawing Sheets

SEPARATION SYSTEM FOR USE WITH WEIGHTING MATERIALS IN DRILLING FLUIDS

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to the recovery of solids, such as barite, from a drilling fluid. More particularly, the present invention relates to the use of separation chambers for the treatment of the drilling fluid so as to remove the weighting materials therefrom. Additionally, the present invention relates to systems in which high-density solids from the drilling fluid can be returned for reuse within the drilling system.

2. Description of Related Art Including Information Disclosed Under 37 CFR 1.97 and 37 CFR 1.98

Drilling fluid is used to aid the drilling of boreholes into the earth. Liquid drilling fluid is often referred to as "drilling mud". The three main categories of drilling fluids are water-based muds (which can be dispersed and non-dispersed), non-aqueous muds, usually called oil-based muds, and gaseous drilling fluid, in which a wide range of gases can be used.

The main functions of drilling fluids include providing hydrostatic pressure to prevent formation fluids from entering into the wellbore, keeping the drill bit cool and clean during drilling, carrying out drill cuttings, and suspending the drill cuttings while drilling is paused and when the drilling assembly is brought in and out of the hole. The drilling fluid used for a particular job is selected to avoid formation damage and to limit corrosion.

Most basic water-based mud systems begin with water, then clays and other chemicals are incorporated into the water to create a homogenous blend. The clay is usually a combination of native clays that are suspended in the fluid while drilling, or specific types of clay that are processed and sold as additives for the water-based mud system. The most common of these is bentonite, frequently referred to in the oil field as "gel". Many other chemicals (e.g. potassium formate) are added to a water-based mud system to achieve various effects, including: viscosity control, shale stability, enhanced drilling rate of penetration, cooling and lubricating of equipment.

On a drilling rig, mud is pumped from the mud pits through the drill string where it sprays out of nozzles on the drill bit, cleaning and cooling the drill bit in the process. The mud then carries the crushed or cut rock ("cuttings") up the annular space between the drill string and the sides of the hole being drilled, up through the surface casing, where it emerges back to the surface. Cuttings are then filtered out with either a shale shaker and the mud returns to mud pits. The mud pits let the drilled "fines" settle. The pits are also where the fluid is treated by adding chemicals and other substances.

Water-based drilling mud most commonly consists of bentonite clay with additives such as barium sulfate (barite), calcium carbonate or hematite. Presently, barite is in short supply. As such, barite becomes a very costly item for the drilling operation. Also, the lack of availability of barite enhances the desire for operators to conserve the barite as much as possible and to avoid the loss of barite during the drilling processes. Barite is added to the drilling fluid to increase the overall density of the drilling fluid so that sufficient bottom hole pressure can be maintained so as to prevent an unwanted (and often dangerous) influx of formation fluids. This barite is often referred to as "weighting material".

In addition to drill bit cooling, lubrication, and cuttings removal, the drilling fluid is used for well control. For instance, the mud is used to prevent formation fluid from entering the wellbore. When the hydrostatic pressure of mud in the wellbore annulus is equal to or greater than the formation pressure, formation fluid will not flow into the wellbore and mix with the mud. The hydrostatic pressure of the mud is dependent upon the mud density and the vertical depth. Thus, to prevent formation fluid from flowing into the wellbore, the mud is selected based on its density to provide a hydrostatic pressure exceeding the formation pressure. At the same time, however, the hydrostatic pressure of the mud must not exceed the fracture strength of the formation, thereby causing mud filtrate to invade the formation and a filter cake of mud to be deposited on the wellbore wall.

In the past, centrifuge systems have been utilized for the purpose of recovering the high density solids, such as barite, from the drilling fluid. FIG. 1 is an illustration of a prior art system in which a centrifuge is utilized so as to recover the high density solids from the drilling fluid.

As can be seen in FIG. 1, the centrifuge system 10 initially receives the drilling fluid from a rig 12. The solids-containing drilling fluid is passed along line 14 to a shaker 16. The shaker 16 is a conventional shaker system that serves to remove large rocks and particles from the drilling fluid. Typically, a shaker will include a screen which vibrates so that the large particles are passed as an overflow outwardly along line 18 for disposal. It can be seen that the oversized solids are removed from the drilling fluid 14 by the shaker 16. The smaller particles contained within the drilling fluid are then passed outwardly along line 20 to a first tank 22. A pump 24 serves to draw the solids-containing drilling fluid from first tank 22 along line 26 and outwardly toward a centrifuge 28. Since the centrifuge 28 has a relatively small capacity (i.e. less than 200 gallons per minute for barite recovery), only a portion of the flow from the pump 26 will pass along line 30 into the centrifuge 28. Another portion of the flow will pass along bypass line 32.

The centrifuge 28 is a low G-force centrifuge. As such, it serves to treat a larger flow of the solids-containing drilling fluid. The centrifuge works by providing strong centrifugal forces to the solids-containing drilling fluid such that the solids will pass as an underflow along line 34 and the a low-density fluid will pass outwardly as an overflow along line 36 from the centrifuge 28. The high-density fluid passing along line 34 will be delivered to a tank 40. The low density drilling fluid will pass along line 36 to another tank 42. The high-density drilling fluid from tank 40 is pumped through line 44 through a pump 46 and toward a mud tank 48. Mud additives are delivered along line 50 to the tank 48. The low-density drilling fluid in tank 42 is drawn through pump 52 to a high G-force centrifuge 54. The high G-force centrifuge 54 is a polishing centrifuge which serves to remove undersize solids for disposal along line 56. The remaining liquid will pass as an overflow through line 58 into tank 48 for mixture with the high-density drilling fluid in tank 48. A mud pump 60 will draw the high-density drilling fluid from tank 48 through line 62 and pass the fluid along line 64 for use by the rig 12.

In the configuration shown in FIG. 1, a pair of centrifuges 28 and 54 are required for the proper treatment of the solids-containing drilling fluid. Importantly, centrifuges are relatively complex pieces of equipment and are very expensive. Typically, each centrifuge can cost over one million dollars. Since the centrifuges are very complex pieces of equipment, highly trained personnel are required in order to properly control the equipment. The centrifuges have a relatively low capacity. As such, the drilling fluid can only be treated at a relatively low rate. As such, additional drilling fluid may have to be added to the system following the centrifuge-treatment in order to satisfy the requirements of the drilling rig 12. When the new drilling fluid is added, additional quantities of barite will be required. This further adds cost and expense to the system. Centrifuges are desired because of the fact that they seldom clog. However, the complexity of the centrifuges often adds significant maintenance expenses to the treatment process. It is also very difficult to properly size the centrifuges or array of centrifuges to the requirements of the rig system.

In offshore application in association with dual density drilling fluid, the centrifuges become increasingly impractical. In view of the need to inject one density of drilling fluid adjacent to the sea floor, it would be necessary to install a centrifuge adjacent to the sea floor. Since this is virtually impossible, the high-density drilling fluid at the sea floor is delivered to the surface (a considerable distance) and then treated at the surface so as to preserve the barite, and then re-injected as a light stream to dilute the riser. Additionally, in offshore output applications, these expensive centrifuges may need repair. It is very difficult to deliver additional centrifuges to the offshore location. As such, this necessitates the need to provide several centrifuges (above operation requirements) in order to satisfy the requirements in the event that one of the centrifuges should become disabled. Once again, this adds significantly to the expense of preserving the barite within the drilling fluid treatment system. As such, a need has developed so as to provide a proper system for the recovery of solids from drilling fluid that avoids the problems associated with centrifuges.

In the past, various patents have issued relating to the recovery of solids from drilling fluids. For example, an early patent was U.S. Pat. No. 2,982,401, issued on May 2, 1961 to C. F. Talbot. This patent describes a process for reclaiming barite from waste drilling fluids. This process includes the steps of collecting used drilling mud substances, washing the substances with water to remove soluble components therefrom, elutriating the substances remaining after washing to remove the insoluble components including bentonite and drilling cuttings, thickening the heavier substance comprising barite constituents remaining after elutriating to a desired consistency, subjecting the heavier substance (including the barite constituents) to a froth floatation to recover the barite constituents from the substance. The recovered heavier substance (including barite) is dried for subsequent use.

U.S. Pat. No. 3,737,037, issued on Jun. 5, 1973 to L. Bone, provides a drilling fluid treatment to remove substantially all suspended solid particles. The drilling fluid is centrifuged to remove particles of sizes down to about 20 microns in diameter followed by adding a flocculating agent to form flocs of particles from about 20 microns to less than 2 microns in the diameter. The flocs are filtered from the drilling and fluid provide a liquid substantially free of suspended solid particles for reuse as a drilling fluid.

U.S. Pat. No. 4,482,459, issued on Nov. 13, 1984 to C. Shriver, discloses a continuous process for the reclamation of waste drilling fluids. The process includes the step of conducting the drilling mud slurry to a slurry surge tank for liquid solid separation by chemical and physical methods. The mud slurry is subjected to a primary solids separation unit after pH adjustment is used to initiate coagulation and an organic flocculant is added to aid flocculation of the solids. The water is then subjected to a secondary solids removal and the solids that are recovered are reintroduced to the primary solids separation unit.

U.S. Pat. No. 4,804,461, issued on Feb. 14, 1989 to G. Heinrich, provides a process for recovering barite from drilling muds. In particular, this method utilizes classifying processes during drilling rig operation so as lead to the disposal of fine grained barite. A simple one-stage flotation process utilizes alkylphosphate-based collecting and foaming reagents applied to recover the barite content of such muds. The flotation is carried out at a pH of 8 to 9 with regulating reagents.

U.S. Pat. No. 4,836,302, issued on Jun. 6, 1989 to Heilhecker et al., teaches an apparatus and method for removing oil-based drilling mud additives from drilling cuttings. The oil-based mud-laden cuttings are transported to a solid feed tank wherein the oil-based cuttings are subjected to turbulent mixing to leave the surface of the cuttings substantially free of oil. The cuttings are then transported to a countercurrent flow column and subjected to a countercurrent laminar flow of solvent in order to separate oily solvents and fines smaller than a chosen diameter from the heavier solids. The heavier solids are cleaned of any remaining oil-based muds, separated from the cleaning solvent, and returned to the sea environment. The method further includes the step of treating the oil-based mud-laden solvent for separation of the remaining solvent for return of the solvent to the continuous process and for the recycling of the recovered oil-based drilling mud to the drilling mud system.

U.S. Pat. No. 6,036,870, issued on Mar. 14, 2000 to Briant et al., provides a method of wellbore fluid recovery using centrifugal force. A wellbore fluid mixture is fed to a decanting centrifuge. The wellbore fluid includes at least one liquid component and undesirable solids. The undesirable solids are separated from the wellbore fluid with the decanting centrifuge so as to produce an intermediate fluid containing the liquid content component and a reduced amount of the undesired solids. The intermediate fluid is fed to a secondary centrifuge so as to produce a final fluid containing the liquid component and a reduced amount of the undesired solids.

U.S. Pat. No. 7,867,399, issued on Jan. 11, 2011 to Jones et al., discloses a method for treating drilling mud. The method includes the step of removing the coarse solids from the mud, breaking the emulsion and separating the hydrophobic phase from the water phase and the solid phase. The residual water and oil are vaporized from the solids and burned off of the vaporized oil.

U.S. Patent Publication No. 2002/0074269, published on Jun. 20, 2002 to Hensley et al., provides a drilling mud clarification or reclamation system. High gravity and low gravity solids are removed from the drilling mud in respective centrifugal separator stages. A plurality of in-line mass flow sensors are provided provide real-time indication of the effectiveness of the clarification of the drilling mud and provide control system to a central control station. The heavier weight components are separated from the mud and returned to the system for further use. The lighter weight components are removed and discarded to clean the mud. A de-sludging centrifuge is provided to remove very fine cuttings.

U.S. Pat. No. 4,208,270, issued on Jun. 17, 1980 to Grieve et al., discloses a hydrocyclone assembly for use with high temperature feeds such as hot petroleum liquids. The hydrocyclone body is formed of a ceramic material with one end being flanged and cooperating with an inlet head. These parts are clamped against a mounting plate. The mounting plate minimizes breakage of the hydrocyclone body when used with high temperature fluid feed.

U.S. Pat. No. 2,671,560, issued on Mar. 9, 1954 to Fontein et al., discloses the use of multiple hydrocyclones. This multiple-hydrocyclone configuration includes a cylindrical block with a cylindrical hole centrally formed therethrough and radial holes connecting the central hole with the periphery of the block. The bores have a diminishing diameter from one end to the other end. Each bore has, at the large end, and infeed entrance tangentially debouching thereinto. The axes of the bores are arranged on two cylinders co-axial with the block. The infeed entrances of the bores of the inner cylinder are connected with the central hole. The infeed entrances of the bores of the outer cylinder are connected with the periphery of the block. A cover plate for each bore has a co-axial aperture therethrough and a tubular member extending axially from the cover plate into the bore.

It is an object of the present invention to provide a separation system that effectively removes weighting materials, such as barite, from a drilling fluid.

It is another object of the present invention to provide a separation system that has no moving parts.

It is another object of the present invention to provide a separation system that has a substantially lesser cost than centrifuges.

It is another object of the present invention provide a separation system that produces a barite slurry and avoids a thick paste output.

It is another object of the present invention to provide a separation system that is able to process consistently regardless of the density of the drilling fluid.

It is a further object of the present invention to provide a separation system that involves minimal maintenance.

It is still further object of the present invention to provide a separation system that is easy to install.

It is still a further object of the present invention to provide a separation system that is easy to manufacture, easy to use, and relatively inexpensive.

These and other objects and advantages of the present invention will become apparent from a reading of the attached specification and appended claims.

BRIEF SUMMARY OF THE INVENTION

The present invention is a separation system for use with weighting materials in drilling fluids. The separation system comprises a body having an interior, a distribution chamber positioned in the interior of the body, a drilling fluid inlet pipe extending into the body and communicating with the distribution chamber, an overflow chamber positioned in the body, and at least one separation chamber positioned in the body and extending below the distribution chamber. The overflow chamber has an outlet. The distribution chamber is configured to allow the drilling fluid to pas to the separation chamber. The separation chamber has a high-gravity solids outlet adjacent a lower end thereof and a fluid outlet at an upper end thereof. The fluid outlet communicates with the overflow chamber.

The distribution chamber is positioned below the overflow chamber in the body. The separation chamber has a channel extending to the distribution chamber such that the drilling fluid can flow toward an inlet of the separation chamber. The channel has a generally J-shape pathway extending from the distribution chamber to the separation chamber. The separation chamber has an inner diameter that tapers so as to narrow from the upper end thereof to the lower end thereof.

A classifier is affixed at the lower end of the separation chamber. The classifier has an interior passageway that communicates with an interior of the separation chamber. The classifiers is removably affixed to the lower end of the separation chamber. The interior of the classifier has a tapered inner diameter that narrows from an upper end of the high-gravity solids outlet of the separation chamber to a bottom end thereof.

In the present invention, the at least one separation chamber comprises a plurality of separation chambers. Each of the plurality of separation chambers has a longitudinal axis. The longitudinal axis of one of the plurality of separation chambers is in spaced parallel relation to the longitudinal axis of another of the plurality of separation chambers. Each of the plurality of separation chambers has a channel extending to the distribution chamber.

A cap is affixed over the distribution chamber and over the separation chambers. The cap has a projection extending downwardly into the upper end of the separation chamber. The projection of the cap has an aperture extending therethrough. This aperture is the fluid outlet of the separation chamber. The aperture is in communication with the overflow chamber. The projection has an outer diameter that is less than in inner diameter of the separation chamber at the upper end of the separation chamber. A vent opens at the overflow chamber and opens to an exterior of the body such that an interior of the overflow chamber is maintained at generally atmospheric pressure.

The present invention is also a system that includes a drilling rig that produces a solids-containing drilling fluid therefrom, a shaker connected by a line to the drilling rig such that the solids-containing drilling fluid is passed along the line to the shaker. The shaker is adapted to remove large solids from the drilling fluid so as to pass a remaining solids-containing drilling fluid therefrom. A separation chamber is connected by a line to the shaker such that the remaining solids-containing drilling fluid from the shaker flows into the separation system. The separation system includes a body having an interior, a distribution chamber positioned in the interior of the body, a drilling fluid inlet pipe extending into the body in communication with the distribution chamber, an overflow chamber positioned in the body, and at least one separation chamber positioned in the body and extending below the distribution chamber. The overflow chamber has an outlet. The separation chamber has a high-gravity solids outlet adjacent a lower end thereof. The separation chamber has a fluid outlet at an upper end thereof. The fluid outlet communicates with the overflow chamber.

In the system of the present invention, a polishing centrifuge is connected by a line to the overflow chamber of the separation system. This polishing centrifuge is adapted to remove fine particles from the fluid from the overflow chamber. The high-gravity solids outlet of the separation chamber is connected to a mud tank.

The foregoing Section is intended to describe, with particularity, the preferred embodiment of the present invention. It is understood that modifications to this preferred embodiment can be made within the scope of the present invention. As such, this Section should not to be construed, in any way, as being limiting of the broad scope of the present invention. The present invention should only be limited by the following claims and their legal equivalents.

DETAILED DESCRIPTION OF THE INVENTION

Figure 1:
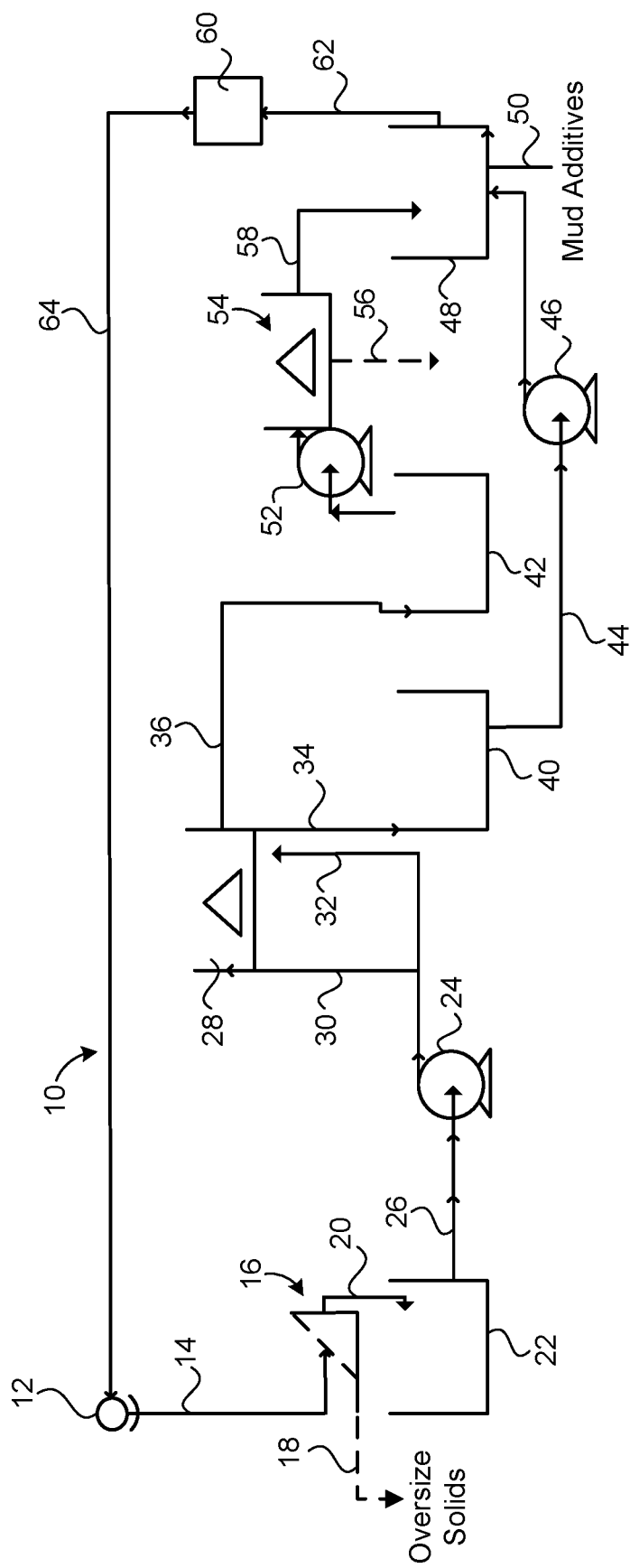
FIG. 1 is a diagrammatic view of a prior art separation system.
Figure 2:
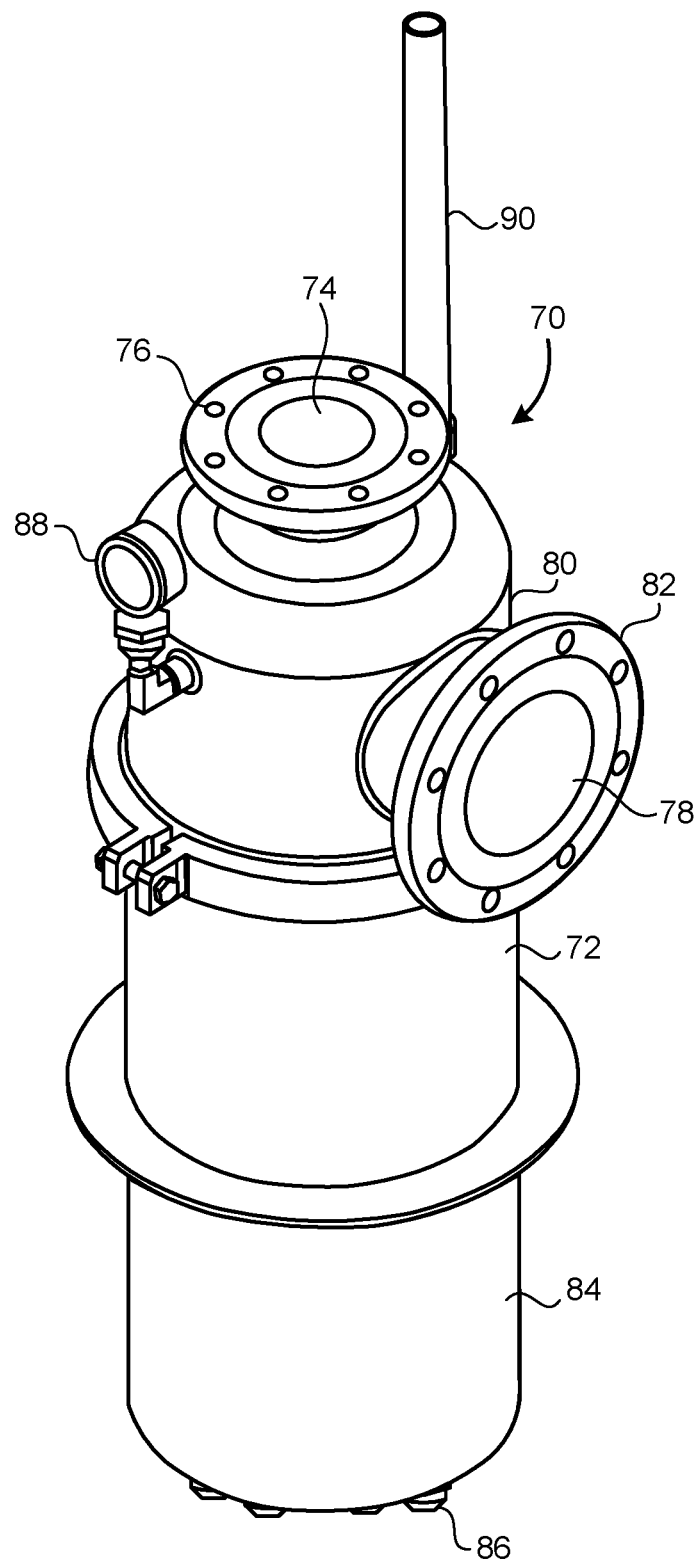
FIG. 2 is an upper perspective view of the separation system of the present invention.

Referring to FIG. 2, there shown the separation system 70 in accordance with the preferred embodiment of the present invention. The separation system 70 includes a body 72 having an interior therein. The body 72 has a solids-containing drilling fluid inlet 74 at an upper end thereof. A flange 76 is provided around the inlet 74 so as to allow the separation system to be suitably connected, in process, with the line extending from the shaker. In particular, the separation system 70 will be used in place of the low-force centrifuge 28 of FIG. 1. As such, the solids-containing fluid inlet 74 will be connected to the line extending from the shaker.

The body 72 also contains a fluid outlet 78 extending from a side of the body 72. In particular, the fluid outlet 74 will be in communication with the interior of an overflow chamber 80 located within the body 72. The fluid outlet 78 includes a flange 82 so as to allow the fluid outlet 78 to be connected to a line extending from the separation system 70. As a result, the fluid passing from the outlet 78 can be delivered to the polishing centrifuge 54 (as shown in FIG. 1). The body 72 also has a portion 84 which extends around a plurality of separating chambers contained therein. A high-gravity solids outlet 86 will extend outwardly of the bottom of the body 72. A pressure gauge 88 is illustrated as connected to the body 72 so as to communicate with the overflow chamber 80 so as to measure pressures within the overflow chamber 80. A vent 90 extends upwardly from the body 72. The vent 90 will communicate with the interior of the overflow chamber 80 so as to allow gas pressure to be released therefrom such that the interior of the overflow chamber 80 is maintained that nearly atmospheric pressure.

Figure 3:
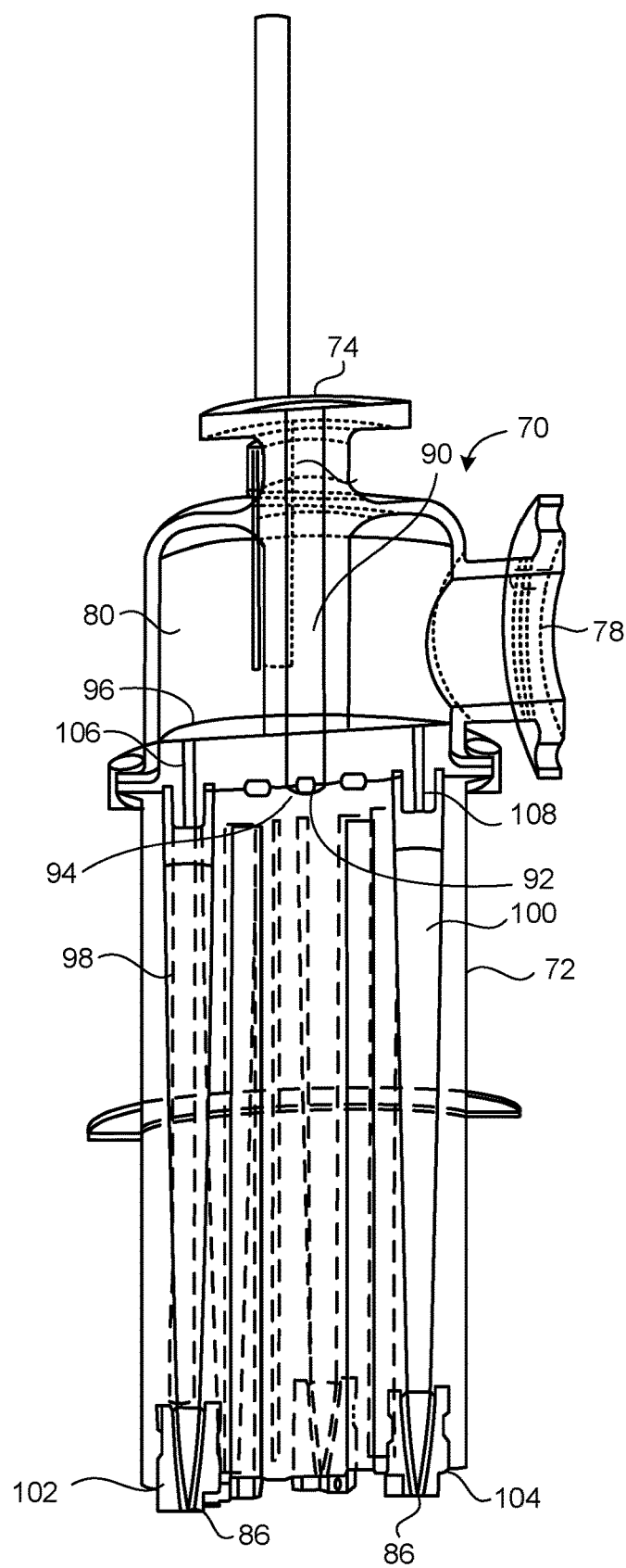
FIG. 3 is a cross-sectional view of the separation system of the present invention.

FIG. 3 shows the interior of the separation system 70 of the present invention. In particular, the separation system 70 includes the body 72. An overflow chamber 80 is formed in the interior of the body 72. The solids-containing fluid inlet 74 is connected to a pipe 90 so as to extend through the interior of the overflow chamber 90 so have an inner end 92 communicating with a distribution chamber 94. A cap 96 will extend around the pipe 90 and over a plurality of separation chambers 98 and 100. As will be described hereinafter, the distribution chamber 94 communicates with the upper end of the separation chambers 98 and 100.

The overflow chamber 80 communicates with a fluid outlet 78. As such, any fluids that will reside in the overflow chamber 80 can be passed therefrom through the fluid outlet 78.

In FIG. 3, it can be seen that the separation chambers 98 have an extended length. In particular, the longitudinal axis of each of the separation chambers 98 and 100 will be in generally spaced parallel relationship to each other. Each of the separation chambers 98 and 100 tapers so as to have a wide end at an upper end thereof and a narrow end at a lower end thereof. A classifier 102 is affixed to the lower end of the separation chamber 98. Another classifier 104 is affixed to the lower end of the separation chamber 100. Each of the classifiers 102 and 104 is configured so as to allow the user to change the size and/or angle of the interior thereof to allow the classifiers 102 and 104 to adapt to the various qualities of the high-gravity solids passing outwardly of the lower end of each of the separation chambers 98 and 100.

The cap 96 includes an aperture 106 extending therethrough. Aperture 106 has one end communicating with the upper end of the interior of the separation chamber 98. Aperture 106 has another end communicating with the interior of the separation chamber 80. Similarly, the cap 96 has another aperture 108 that has a lower end communicating with the upper end of the separation chamber 100 and also communicates with the interior of the overflow chamber 80.

In normal use, the solids-containing fluid from the shaker will pass into the solids-containing fluid inlet 74 and through the pipe 90. The fluid will exit the pipe 90 at the distribution chamber 92 and then will flow radially outwardly so as to enter the upper end of the separation chambers 98 and 100. Within the concept of the present invention, this solids-containing fluid is passed under pressures of greater than 100 p.s.i. As result, this flow will be forced in a direction toward the walls of the separation chambers 98 and 100 so as to create a spiral flow pattern within each of the separation chambers 98 and 100. The velocity of this spiral flow pattern will have an effect such that the greater density material will move downwardly through the interior of each of the separation chambers 98 and 100 so as to enter the classifiers 102 and 104 and to exit the outlets 86. As a result, the high-gravity solids will be discharged from the separation system 70 and into an underflow chamber or elsewhere. Typically, this underflow chamber can be in the nature of a collection vessel, such as a mud tank, a pan, a barrel, or similar collection vessel. This high-gravity solids output will be in the nature of a barite slurry. As such, unlike centrifuge systems, the separation system 70 of the present invention actually discharge is a slurry, rather than a paste. Such a fluid can move more easily through the system.

The spiral flow pattern of fluid within each of the separation chambers 98 and 100 will cause the lower gravity fluids, such as water, diesel fuel, and very small particles, to move upwardly so as to migrate through the apertures 106 and 108 and into the overflow chamber 80. As such, these fluids can be discharged through the outlet 78 for further processing by the polishing centrifuge. The present invention is properly able to achieve the separation of the barite from the drilling fluid in a separation system that involves no moving parts. The present invention is adaptable to various densities or viscosities of the returned drilling fluid. As a result, the adjustments of the centrifuge so as to accommodate these varying densities in viscosities would not be required by the present invention. The present invention is also able to use the classifiers 102 and 104 so as to accommodate the densities and/or viscosities of the high-gravity solids passing outwardly of the outlets 86.

Figure 4:
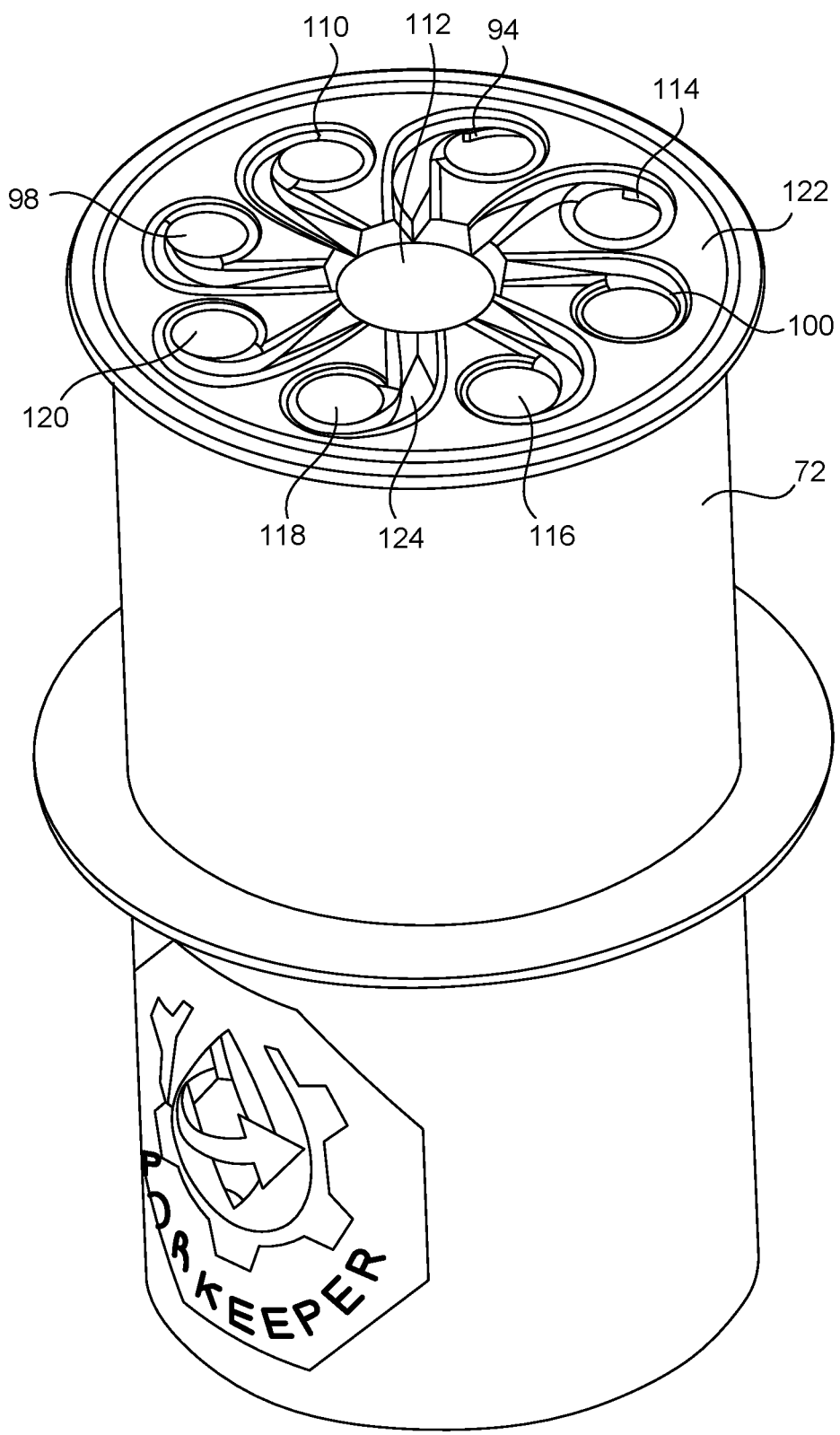
FIG. 4 is an upper perspective view of the separation system of the present invention with the overflow chamber removed therefrom.

FIG. 4 shows the body 72 with the overflow chamber 80 removed therefrom. In particular, the configuration of the distribution chamber 94 is particularly illustrated. The distribution chamber 94 is configured so as to allow the solids-containing fluid to pass to the separation chambers 98 and 100. It can further be seen that there are also separation chambers 110, 112, 114, 116, 118 and 120 that are arranged in a circular pattern and which open at surface 122. Each of the separation chambers 98, 100, 110, 112, 114, 116, 118 and 120 has a configuration similar to that shown in FIG. 3. Each of the separation chambers also includes a channel that will extend from the periphery of the distribution chamber 94 so as to open toward a side surface of each of the separation chambers. It can be seen that the channel 124 has a generally J-shape configuration. So as to improve the fluid dynamics, the fluid will enter the channel 124 at a generally circular opening and be discharged into the interior of the separation chamber through a generally rectangular shaped opening. This flow pattern, through the curve of the J-shape configuration, assures the initiation of the spiral flow pattern of the fluid within each of the separation chambers. As such, a high-velocity discharge of fluid into the separation chambers is assured.

Figure 5:
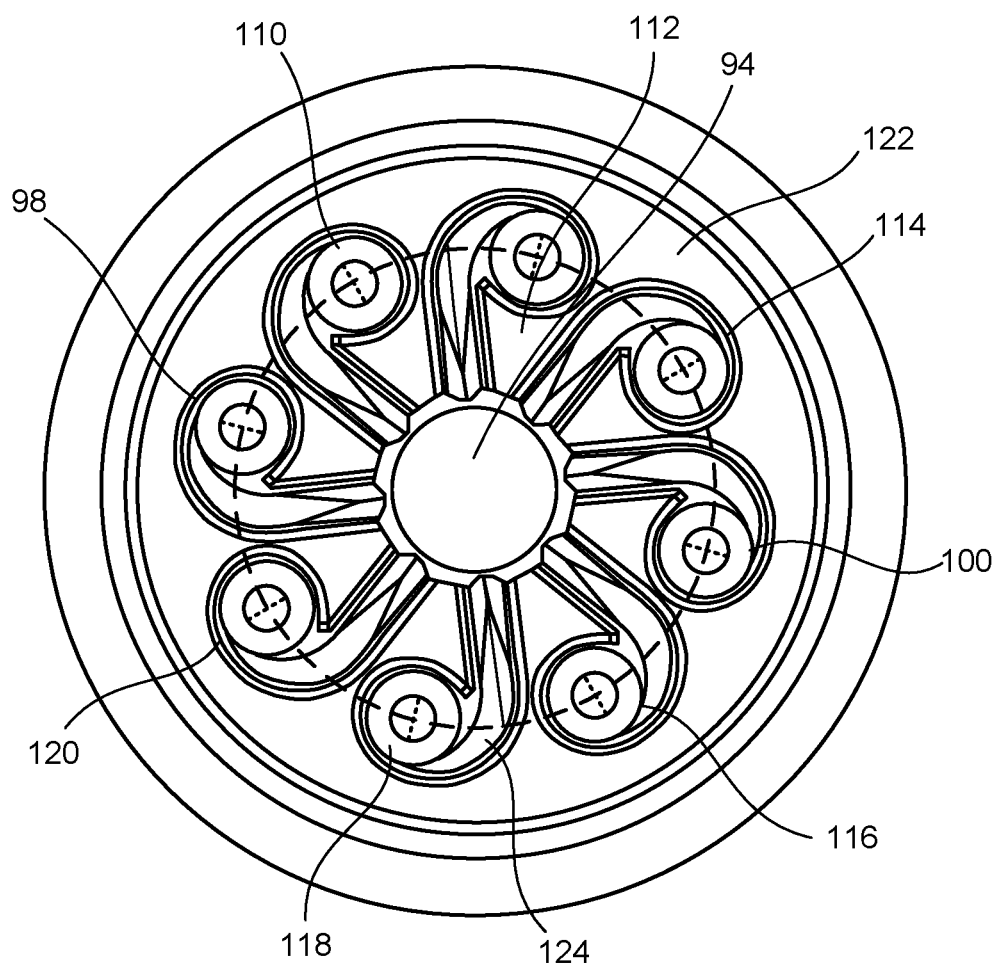
FIG. 5 is a plan view showing the distribution chamber and the plurality of separation chambers of the present invention.

FIG. 5 is a detailed view showing the configuration of the distribution chamber 94 on the surface 122. Each of the separation chambers 98, 100, 110, 112, 114, 116, 118 and 120 opens at the surface 122. The channel 124 is illustrated as extending in a J-shaped pattern from the distribution chamber 94 toward the periphery of the separation chamber.

Figure 6:
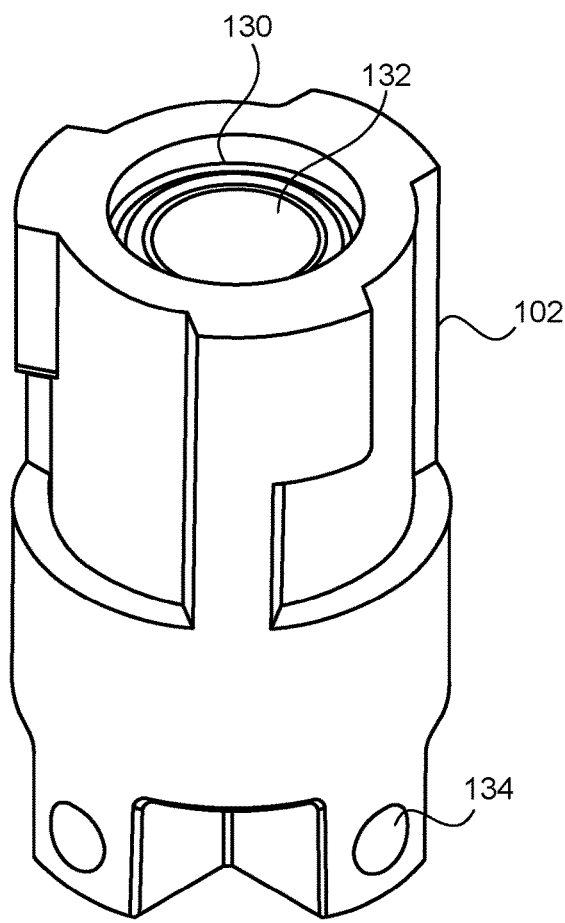
FIG. 6 is an upper perspective view of the classifier as used in the present invention.

FIG. 6 illustrates the classifier 102 that can be attached to the lower end of the separation chamber. The classifier 102 has a connector 130 at an upper end thereof. Typically, this connector 130 can be threaded or can be a slotted configuration whereby a quarter-turn allows the classifier 102 to be quickly attached to the lower end of the separation chamber. The classifier 102 has an upper inlet end 132 such that the high-gravity solids passing toward the lower end of the separation chamber can enter the interior of the classifier 102. The classifier 102 also includes a receptacle 134 at a lower end thereof so that a suitable wrench can be utilized so as to secure the classifier 102 to the separation chamber.

Figure 7:
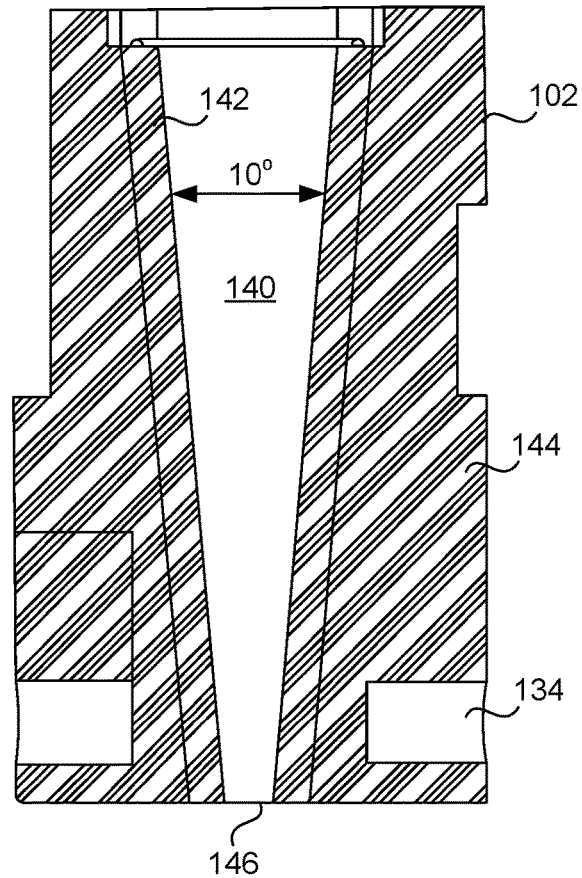
FIG. 7 is a cross-sectional view of the classifier as used in the present invention.

FIG. 7 shows the interior of the classifier 102. It can be seen that the classifier 102 has an interior 140 that has a generally tapered inner diameter in which a wide end of the tapered interior diameter is adjacent an upper end thereof and a narrow diameter of the interior 140 is at a lower end thereof. A liner 142 can be positioned within the interior 140 so as to define this tapered interior. The liner 142 can be formed of an abrasion-resistant and corrosion-resistant material. The liner 142 can be replaceable, as required. The body 144 of the classifier 102 can be formed of a steel material so as to allow the classifier 102 to be rigidly mounted. The receptacle 134 is located at a lower end thereof so as to allow the prongs of a suitable wrench to be fitted therein.

Importantly, in the present invention, the classifier 102 can be suitably replaced so that the angle of taper of the interior 140 can be adjusted. In FIG. 7, it can be seen that the inner wall of the classifier 102 has a 10° taper. However, this amount of taper can be adapted to the barite concentration of the solids-containing material passing from the outlet of the separation chamber. The classifier 102 can function in the same manner as the nozzle of a centrifuge. As such, the classifier 102 can be adapted to the configurations of the drilling mud and/or drilling fluid used by the drilling rig. The discharge end 146 of the classifier 102 can be directed to a mud pit or other underflow chamber.

Figure 8:
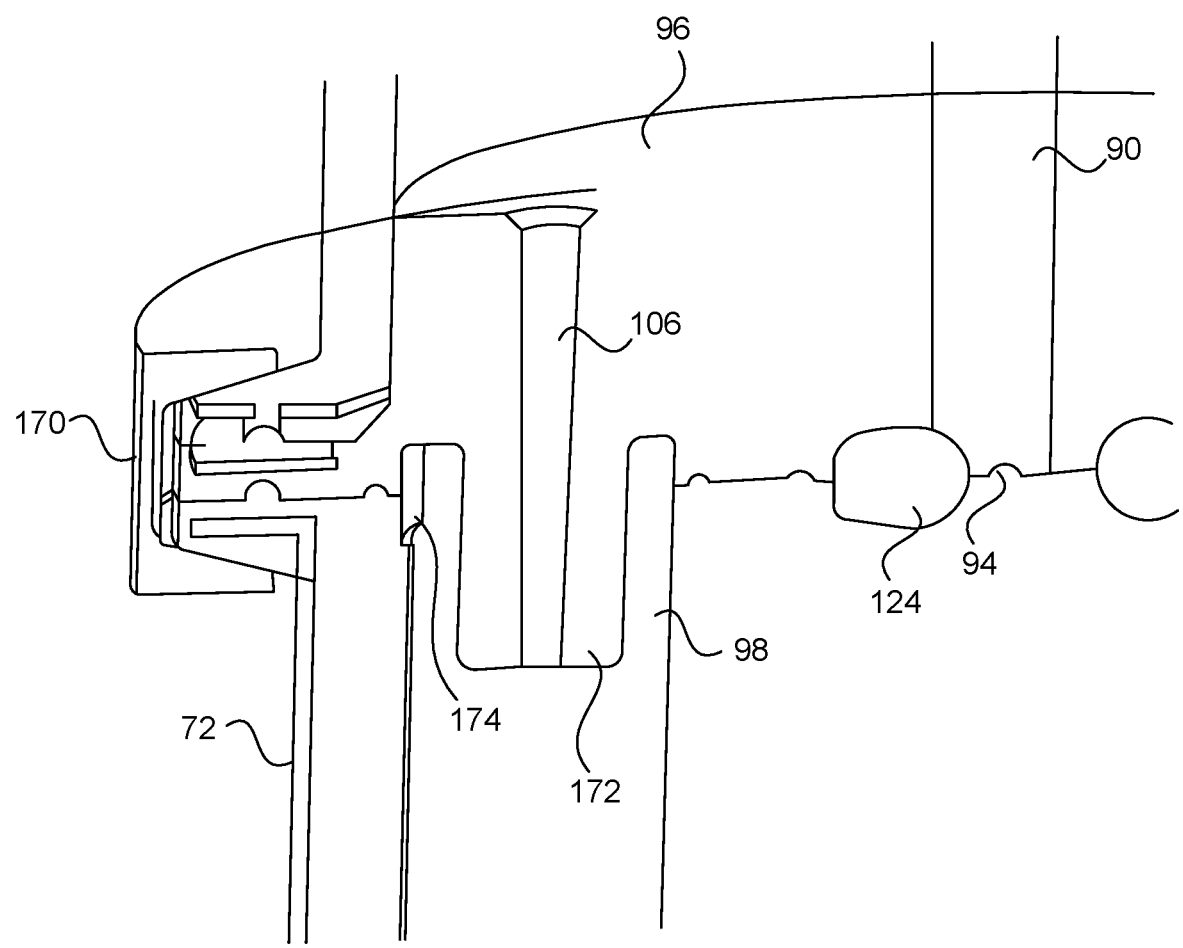
FIG. 8 is a detailed view showing the placement of the cap over each of the separation chambers.

FIG. 8 shows, in particular, the configuration of the cap 96 as utilized in the separation system of the present invention. It can be seen that the 96 is secured by a flange connection 170 to the body 72 of the separation system 70. The cap 96 includes a projection 172 that extends downwardly into the upper end of the separation chamber 98. This projection 172 has an outer diameter that is less than the inner diameter of the separation chamber 98 at the upper end thereof. The projection 172 and the cap 96 includes an aperture 106 extending therethrough. Aperture 106 is intended to allow the low-density fluid from the separation chamber 98 to flow upwardly therethrough and into the overflow chamber 80.

The pipe 90 serves to deliver the solids-containing fluid to the separation chamber 98. The pipe 90 communicates with the distribution chamber 94 so as to cause a flow of such a fluid into the channel 124. Channel 124 will extend outwardly through the cap 96 or along the surface 122 so as to have an outlet 174 opening to the interior of the separation chamber 98 in the area in which the projection 172 extends. The projection 172 can then facilitate the establishment of the toroidal flow pattern of such fluid within the interior of the separation chamber 98. Ultimately, as the toroidal flow pattern of fluid is directed downwardly beyond the bottom of the projection 172, it will still maintain the spiral flow pattern so as to cause the separation of solids and liquids. The solids from the solids-containing fluid will then move downwardly within the separation chamber 98 and outwardly therefrom while the low-density fluids (and small particles) can flow upwardly through the aperture 106 so as to emerge into the overflow chamber 80.

The foregoing disclosure and description of the invention is illustrative and explanatory thereof. Various changes in the details of the illustrated construction can be made within the scope of the present claims without departing from the true spirit of the invention. The present invention should only be limited by the following claims and their legal equivalents.

We claim:

1. A separation system for use with weighting materials in drilling fluids, the separation system comprising:
   a body having an interior;
   a distribution chamber positioned in said interior of said body;
   a drilling fluid inlet pipe extending into said body in communicating with said distribution chamber;

an overflow chamber positioned in said body, said overflow chamber having an outlet;
at least one separation chamber positioned in said body and extending below said distribution chamber, the separation chamber having a high-gravity solids outlet adjacent a lower end thereof, the separation chamber having a fluid outlet at an upper end thereof, said fluid outlet communicating with said overflow chamber and
a classifier affixed at said lower end of the separation chamber, said classifier having an interior passage that communicates with an interior of the separation chamber, said classifier being removably affixed to said lower end of the separation chamber, said interior of said classifier having a tapered inner diameter that narrows from an upper end at said high-gravity solids outlet of the separation chamber through a bottom end thereof.

2. The separation system of claim 1, said distribution chamber positioned below said overflow chamber in said body.

3. The separation system of claim 1, the separation chamber having a channel extending to said distribution chamber such that the drilling fluid can flow toward an inlet of the separation chamber.

4. The separation system of claim 1, the separation chamber having an inner diameter that tapers so as to narrow from said upper end thereof to said lower end thereof.

5. The separation system of claim 1, said at least one separation chamber comprising a plurality of separation chambers, each of said plurality of separation chambers having a longitudinal axis, the longitudinal axis of one of said plurality of separation chambers being in spaced parallel relation to the longitudinal axis of another of said plurality of separation chambers.

6. The separation system of claim 5, each of said plurality of separation chambers having a channel extending to said distribution chamber.

7. The separation system of claim 1, further comprising:
a vent opening at said overflow chamber and opening at an exterior of said body such that an interior of said overflow chamber is maintained generally at atmospheric pressure.

8. A separation system for use with weighting materials in drilling fluids, the separation system comprising:
a body having an interior;
a distribution chamber positioned in said interior of said body;
a drilling fluid inlet pipe extending into said body in communicating with said distribution chamber;
an overflow chamber positioned in said body, said overflow chamber having an outlet;
at least one separation chamber positioned in said body and extending below said distribution chamber, the separation chamber having a high-gravity solids outlet adjacent a lower end thereof, the separation chamber having a fluid outlet at an upper end thereof, said fluid outlet communicating with said overflow chamber; and
a cap affixed over said distribution chamber and over said at least one separation chamber, said cap having a projection extending downwardly into the upper end of the separation chamber.

9. The separation system of claim 8, said projection of said cap having an aperture extending therethrough, said aperture being said fluid outlet of said separation chamber, said aperture communicating with said overflow chamber.

10. The separation system of claim 8, said projection having an outer diameter, said outer diameter of said projection being less than in inner diameter of the separation chamber at the upper end of the separation chamber.

11. The system comprising:
a drilling rig that produces a solids-containing drilling fluid therefrom;
a shaker connected by a line to said drilling rig such that the solids-containing drilling fluid is passed along said line to said shaker, said shaker adapted to remove large solids from the drilling fluid so as to pass a remaining solids-containing drilling fluid therefrom;
a separation system connected by a line to said shaker such that the remaining solids-containing drilling fluid from said shaker flows into said separation system, said separation system comprising:
a body having an interior;
a distribution chamber positioned in said interior of said body;
a drilling fluid inlet pipe extending into said body in communicating with said distribution chamber;
an overflow chamber positioned in said body, said overflow chamber having an outlet; and
at least one separation chamber positioned in said body and extending below said distribution chamber, said distribution configured to allow the drilling fluid to said separation chamber, the separation chamber having a fluid outlet at an upper end thereof and a high-gravity solids outlet adjacent a lower end thereof, said fluid outlet communicating with said overflow chamber, said at least one separation chamber comprising a plurality of separation chambers, each of said plurality of separation chambers having a longitudinal axis, the longitudinal axis of one of said plurality of separation chambers being in spaced parallel relation to the longitudinal axis of another of said plurality of separation chambers.

12. The system of claim 11, the separation channel having a channel extending to said distribution chamber such that the drilling fluid can flow toward an inlet of the separation chamber.

13. The system of claim 11, the separation chamber having an inner diameter that tapers so as to narrow from said upper end thereof to said lower end thereof.

14. The system of claim 13, further comprising:
a classifier affixed at said lower end of the separation chamber, said classifier having an interior passage that communicates with an interior of the separation chamber.

15. The system of claim 11, further comprising:
a polishing centrifuge connected by line to said overflow chamber of said separation system, said polishing centrifuge adapted to remove fine particles from the fluid from said overflow chamber.

16. The system of claim 11, said high-gravity solids outlet of the separation system connected to a mud tank.

* * * * *